July 22, 1952

D. M. CONSIDINE 2,604,108

CONTROL SYSTEM

Filed March 29, 1946

*INVENTOR.*
DOUGLAS M. CONSIDINE

BY *E. Wellford Mason*

ATTORNEY.

Patented July 22, 1952

2,604,108

UNITED STATES PATENT OFFICE 2,604,108

CONTROL SYSTEM

Douglas M. Considine, North Hills, Pa., assignor, by mesne assignments, to Minneapolis-Honeywell Regulator Company, Minneapolis, Minn., a corporation of Delaware Application March 29, 1946, Serial No. 658,023

9 Claims. (Cl. 137—93)

The present invention relates to control of the flow of liquids and more particularly to automatic control of the flow of minute quantities of liquids that are too small to be handled automatically by conventional means.

In various chemical processes it is necessary to feed very small quantities of a reagent into a solution. This has been a difficult procedure to follow exactly since the flows to be controlled are quite frequently in the nature of 50 c. c. per hour. This is considerably below the lower limits of conventional control valves.

It is an object of my invention to control accurately the flow of minute quantities of a liquid. It is a further object of my invention to control accurately the flow of minute quantities of a liquid in proportion to some variable that may be measured and which the liquid under control alters or affects in some manner.

According to my invention the liquid under control is maintained at a substantially constant level in a container and is forced from the container through a small opening by the application of a variable air pressure to the surface of the liquid. The opening in the container is to be made of a size small enough so that the liquid would not ordinarily flow through the same without the application of pressure to it. In cases where the liquid is to be applied to a point of use that is substantially at atmospheric pressure the output of an air controller may be used directly to supply the feeding pressure. In cases where the liquid is to be supplied to a point under a fairly high pressure the output of an air controller may be used to control the application to the liquid of a source of pressure suitably higher than that at the point where the liquid is to be applied.

The various features of novelty which characterize my invention are pointed out with particularity in the claims annexed to and forming a part of this specification. For an understanding of the invention, however, its advantages and specific objects obtained with its use, reference should be had to the accompanying drawings and descriptive matter in which is illustrated and described preferred embodiments of the invention.

Figure 1:
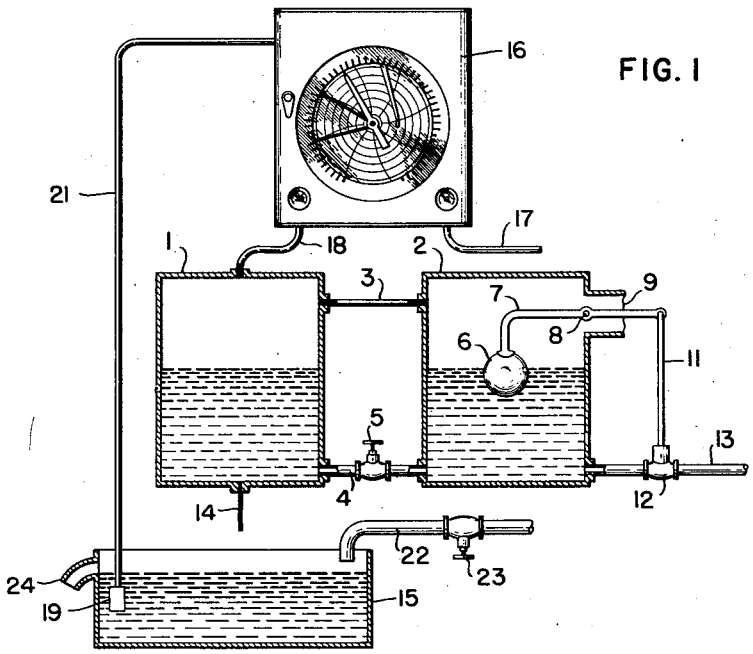
Figure 1 is a view of one form of the control system.

In Figure 1 there is shown a control system in which a liquid is added in very small quantities to a tank having another liquid at atmospheric pressure in it. The control system includes a feeding chamber 1 and a supply chamber 2 that is connected to the feeding chamber by a pair of pipes 3 and 4, the latter of which has a manually adjusted valve 5 in it. Pipe 3 is above the level of liquid that is maintained in the tanks and serves to equalize the pressure in these tanks. Liquid can flow from the supply tank 2 to the feeding tank 1 through pipe 4 at a rate determined by the opening of valve 5. This valve is mainly to prevent sudden surges in the flow of liquid as more liquid is being added to tank 2. The level of the liquid in tank 2 is maintained at substantially constant value by means of a conventional liquid level control system which is shown herein as including a float 6 that rides on the surface of the liquid. This float is mounted on one end of a lever 7 that is pivoted at 8 and which extends out of the tank through a flexible diaphragm 9. Movement of the right end of lever 7 is imparted to a valve stem 11 of a valve 12 that is located in a supply pipe 13. Therefore as the level of the liquid changes valve 12 will be adjusted to supply more or less liquid as needed to maintain the level substantially constant.

Liquid in varying amounts is forced from the tank 1 through a small calibrated orifice 14, that may well take the form of a length of capillary tube, by an air pressure that is applied to the surface of the liquid. This pressure is supplied from an air control instrument 16 which may be of any conventional type but which preferably has a control unit of the type disclosed in Moore Patent 2,125,081 granted on July 26, 1938. This instrument is supplied with air through a pipe 17 and operates in a well known manner to apply a varying pressure through pipe 18 to the surface of the liquid in tank 1. In this case it is intended that the liquid in tank 1 should, for example, be a reagent that is used to control the acidity of a solution in tank 15. To this end there is provided a primary measuring element 19 that is responsive to the hydrogen ion content of the liquid in tank 15. The measuring element is connected by suitable connections 21 with instrument 16 so that the latter may be actuated in response to the hydrogen ion content of the liquid. As shown herein the liquid under measurement is supplied to tank 15 through a pipe 22 having a valve 23 in it. Liquid passes from the tank through an overflow 24.

In the over-all operation of the device the reagent is supplied to tanks 1 and 2 in response to changes in the liquid level in these tanks. Obviously the pressure in pipe 13 must be suitably greater than the maximum pressure of the air supplied by instrument 16 in order for liquid to enter these tanks. Variations in the hydrogen ion content of the liquid in tank 15 are detected by the primary measuring element 19 and are transferred to instrument 16. This instrument operates to set up a control pressure proportional to these responses and this pressure is applied to the surface of the liquid in tank 1. Normally speaking the orifice 14 will be small enough so that no liquid will flow through it under atmospheric pressure, but as a larger pressure is applied to the surface of the liquid more or less of it will be forced through the orifice. In this manner the amount of the reagent going to tank 15 may accurately be controlled even though the flow of liquid through the orifice is considerably lower than any flow that may be controlled by a conventional type of valve.

The orifice 14 may be made of different size or length tubing to take care of liquids of various specific gravities and viscosities, and also to take care of different ranges of flow. It is also noted that using a control system of the type disclosed herein the various parts can be made of material that is resistant to corrosion by the liquid that is being handled. In any chemical plant provision is made for liquid level controllers which are not attacked by the liquid whose level they control. The present invention requires that these tanks be connected in a particular way and that there be added a suitable orifice that can also be made of material that is not attacked by the liquid. The various parts of the control instrument proper do not come in contact with the liquid and they may therefore be made of standard materials.

Figure 2:
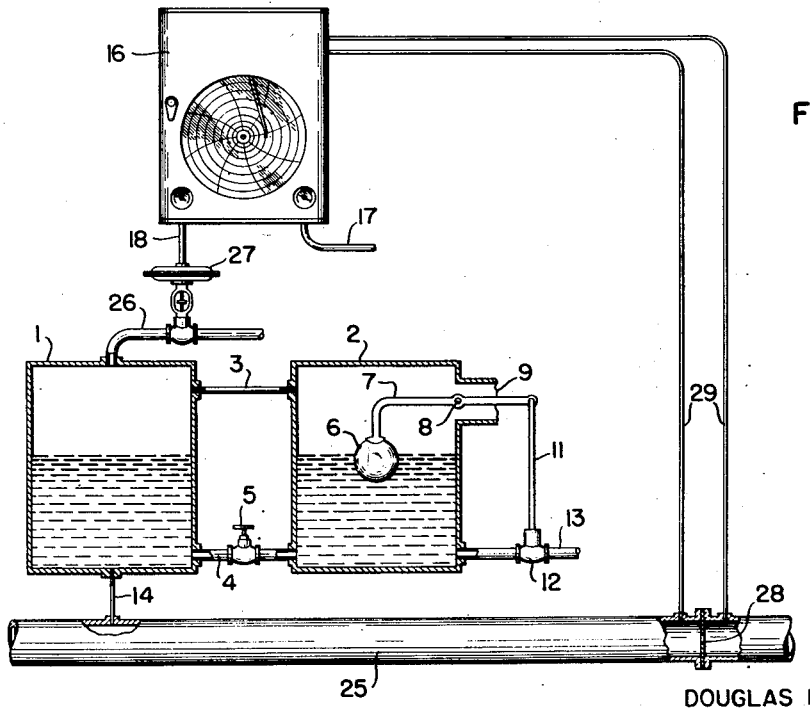
Figure 2 is a view of another form that the control system may take.

The control system in Figure 2 is similar in most respects to that above described in connection with Figure 1 except that this system is designed to apply the reagent liquid in tank 1 to a pipe that is maintained above atmospheric pressure. As disclosed herein the liquid is forced from tank 1 through orifice 14 into a pipe 25 that can be above atmospheric pressure. The liquid is forced from the tank by air that is under a pressure suitably higher than the pressure in pipe 25 and which may be considerably higher than the output pressure which can be obtained in pipe 18 from the control instrument. To this end the air pressure that is applied to the surface of the liquid in tank 1 is supplied through a pipe 26 that has a pneumatically operated control valve 27 in it to control the flow of air. As is shown herein, for example, it is intended that a certain amount of the reagent be added to the pipe 25 in proportion to the flow of fluid through this pipe. Therefore pipe 25 is provided with an orifice 28 on opposite sides of which are connected differential pressure lines 29. These lines extend to the instrument 16 which, in this case, would be responsive to flow and which sets up an air pressure in pipe 18 proportional thereto.

In the operation of this system, the reagent liquid is kept at a substantially constant level in tanks 1 and 2 by the liquid level control system. Pressure applied to the surface of liquid in tank 1 is varied in accordance with the flow of liquid through pipe 25 as measured from the pressure drop across orifice 28. The air control instrument 16 supplies a valve pressure through pipe 18 to open valve 27 in such a way that a suitable pressure is maintained on the surface of the liquid in tank 1. Therefore more or less liquid will be forced from that tank through orifice 14 into the pipe 25 in accordance with its flow.

From the above description it will be seen that I have provided a simple and reliable means of controlling extremely small flows. These flows can range upwardly from numbers of drops per hour depending upon the pressure range of the air applied to the surface of the liquid in the feeding tank and upon the size of the orifice through which the liquid flows to its point of use.

Having now described my invention what I claim as new and desire to secure by Letters Patent is:

1. In a flow control system, the combination of a closed chamber, means to maintain a substantially constant quantity of liquid in said chamber, a small outlet for the liquid in said chamber beneath the level of liquid therein, said outlet being so small that the liquid in said chamber will not flow therefrom due to the hydrostatic head of the liquid contained therein, a supply of fluid under relatively high pressure to be applied in said chamber to said liquid to force said liquid from said outlet, means to set up a relatively low pressure automatically varying in accordance with the values of a condition, and means to regulate said relatively high pressure by said relatively low pressure.

2. In a flow control system, the combination including a closed chamber, means including a liquid-level-operated inlet valve supplying and maintaining a substantially constant level of liquid in said chamber having a bore of capillary size through it and communicating with the liquid in said chamber and being an outlet from said chamber beneath the level of the liquid therein, and a relay valve controlled by a measuring instrument responsive to variations in the values of a condition and adapted to apply pressure to the liquid in said chamber above said level of said liquid so as to expel liquid from said chamber through said small outlet.

3. In a device for automatically controlling the flow of minute quantities of liquid, a closed chamber adapted to contain a supply of liquid at a substantially constant level, a pipe having a bore of capillary size communicating with said chamber beneath the normal level of the liquid therein, and an inlet communicating with the upper portion of said chamber above the normal level of the liquid therein for supplying fluid pressure to the free surface of the liquid in said chamber.

4. In an automatic controller accurately regulating a minute flow of liquid, a closed chamber having an outlet communicating with the lower portion thereof and formed of a pipe having a substantially vertical bore insufficient in size to allow the escape of liquid from said chamber due to the pressure head of the liquid in the chamber, an inlet connection communicating with the interior of the chamber above the liquid therein, and a valve in said inlet pipe controlling the application of fluid pressure to the liquid in said chamber.

5. Apparatus for feeding minute quantities of liquid, including, a liquid-tight and pressure-tight container in which a supply of liquid may be located, an outlet connection having a minute opening through it communicating with the interior of said chamber beneath the liquid level and of a size so small as to prevent the flow of liquid through it under the pressure head of the liquid alone, and mechanism for applying a pressure in addition to the pressure head of said liquid to the liquid in said vessel so as to force said liquid through said outlet conduit.

6. In a flow control device, the combination including, a first closed chamber, means to supply liquid to said chamber to a substantially constant level, a second closed chamber, a connection between said chambers below the level of the liquid, a connection between said chambers above the level of the liquid, a small outlet for the liquid in said second chamber beneath the level of the liquid in said second chamber, said outlet being small enough so that the liquid will not flow therethrough solely in response to the hydrostatic pressure of the liquid in said second chamber when said liquid is at said level therein, and means to apply a pressure proportional automatically to the values of a condition to the surface of the liquid in said chambers to force the liquid in varying amounts through said small outlet.

7. In a flow control device, the combination including, a first closed chamber, means to supply a liquid to said chamber, liquid level responsive means to maintain the level of liquid in said chamber substantially constant, a second closed chamber, a restricted connection between said chambers below the level of said liquid, an equalizing connection between said chambers above the level of said liquid, a small outlet for the liquid in said second chamber beneath the level of the liquid in said second chamber, said outlet being small enough so that liquid will not flow therethrough solely in response to the hydrostatic pressure of the liquid in said second chamber when said liquid is at or below the said level, and means to apply a pressure varying automatically in accordance with the values of a condition to the surface of the liquid in said chambers to force liquid in varying amounts from said outlet.

8. In a flow control system, the combination of a pair of closed chambers, connecting means extending between said chambers beneath the level of liquid therein whereby a liquid in one may flow to the other, connecting means extending between said chambers above the level of liquid therein whereby pressure in said chambers acts on the liquid therein, means to supply a liquid to one of said chambers, liquid level responsive means to control the amount of liquid supplied thereto and to maintain a substantially constant level of liquid in said chambers, an outlet in the other of said chambers having a bore of capillary size therethrough and communicating with the liquid in said chamber and located beneath the level of liquid in said chamber, and means to apply a pressure to the free surface of the liquid in said chambers to force liquid therein from said outlet.

9. In a flow control device, the combination including, a first closed chamber, means to supply liquid to said chamber to a substantially constant level, a second closed chamber, a connection between said chambers beneath the level of the liquid therein through which liquid may flow from said first chamber to said second chamber, a small outlet from said second chamber having a bore of capillary size therethrough and communicating with the liquid in said second chamber and located beneath the level of liquid in said second chamber, through which outlet liquid may flow to a point under pressure, a source of pressure fluid having a pressure greater than the pressure of the point under pressure to which said liquid flows, means applying said pressure to the surface of the liquid in said chambers, and means automatically responsive to variations in the values of a condition to regulate said source of pressure and thereby vary the amount of liquid forced through said outlet.

DOUGLAS M. CONSIDINE.

REFERENCES CITED

The following references are of record in the file of this patent:

UNITED STATES PATENTS

| Number | Name | Date |
|---|---|---|
| 1,212,078 | Liebzeit | Jan. 9, 1917 |
| 2,243,826 | Nielsen | May 27, 1941 |
| 2,314,152 | Mallory | Mar. 16, 1943 |

FOREIGN PATENTS

| Number | Country | Date |
|---|---|---|
| 87,001 | Sweden | of 1936 |